Figure 4:
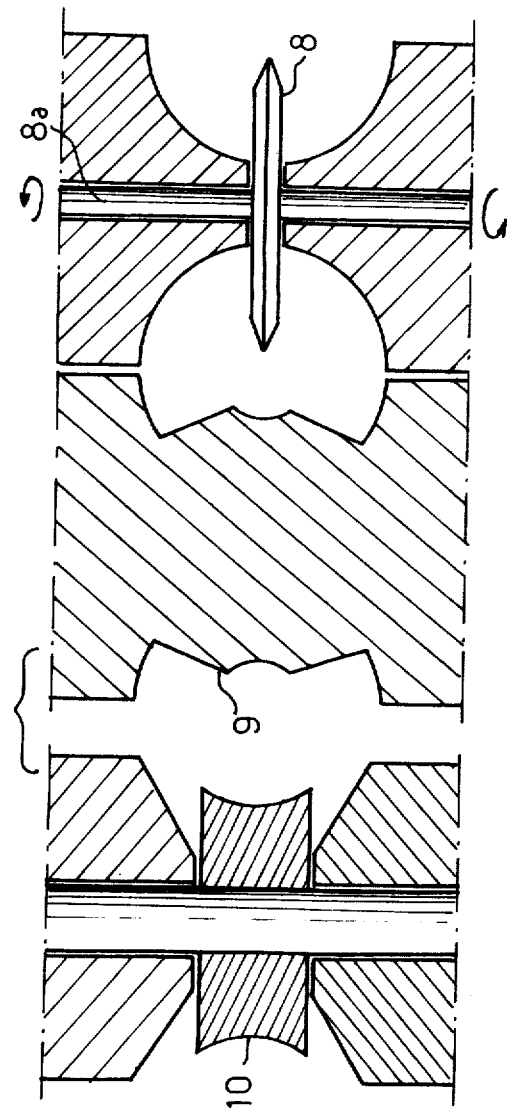

United States Patent [19]

Fradin

[11] 3,890,674

[45] June 24, 1975

[54] APPARATUS FOR REMOVING THE BONES FROM POULTRY

[75] Inventor: Maurice Fradin, Saint Jean de Monts, France

[73] Assignee: Agence National de Valorization de la Researche (ANVAR), Neuilly-sur-Seine, France

[22] Filed: Nov. 30, 1973

[21] Appl. No.: 420,479

[30] Foreign Application Priority Data
Dec. 1, 1972  France .............................. 72.42734
Nov. 13, 1973  France .............................. 73.40231

[52] U.S. Cl. ......................................... 17/11; 17/52
[51] Int. Cl. ............................................. A22b 3/08
[58] Field of Search ............... 17/1 R, 1 G, 11, 11.3, 17/12, 46, 52

[56] References Cited
UNITED STATES PATENTS
| | | | |
|---|---|---|---|
| 2,807,046 | 9/1957 | Hebenheimer .......................... | 17/11 |
| 2,855,094 | 10/1958 | Zebarth ................................. | 17/11 |
| 2,924,846 | 2/1960 | Zebarth ................................. | 17/12 |
| 3,213,488 | 10/1965 | Volpe .................................... | 17/52 |
| 3,303,526 | 2/1967 | Pine et al. ............................. | 17/46 |
| 3,639,945 | 2/1972 | Duncan ................................. | 17/52 |

*Primary Examiner*—Louis G. Mancine
*Assistant Examiner*—James D. Hamilton
*Attorney, Agent, or Firm*—William Anthony Drucker

[57] ABSTRACT

Apparatus for removing the bones from poultry comprising a conveyor means, a series of vertically mounted rollers on either side of said conveyor, and a set of horizontally mounted rollers mounted above the conveyor so that all said rollers form a tunnel with the conveyor to receive the birds. Some of the vertical rollers have cutting means associated with them to sever legs, wings and flesh from the carcass with the aid of grooves in some of the earlier vertical rollers. A driver or preliminary conveyor and cutter means may be provided, e.g., for larger birds, to strip off the wings and legs after which the stripped carcass is fed to the main part of the apparatus whose own wing and leg cutters then run idle. The preliminary and main conveyors may be continuous or separate.

7 Claims, 11 Drawing Figures

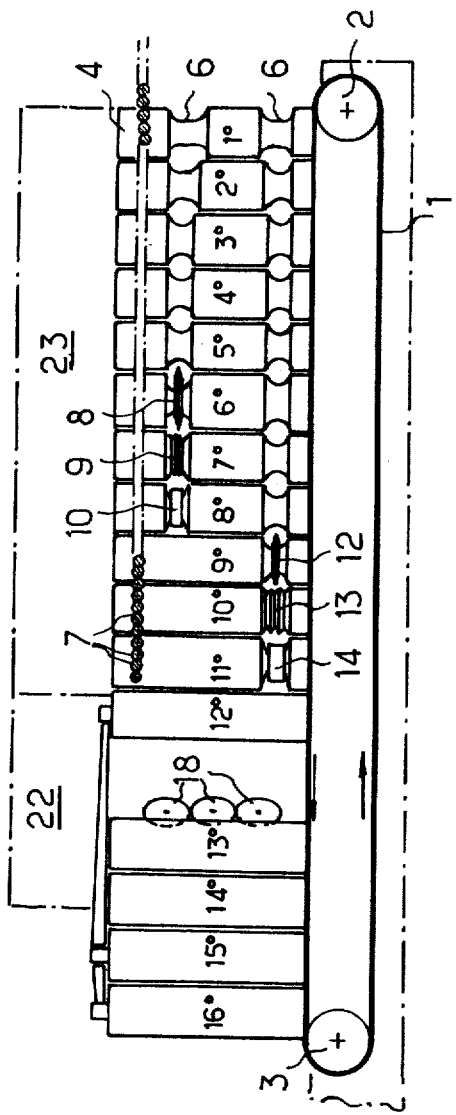
FIG. 1
FIG. 2
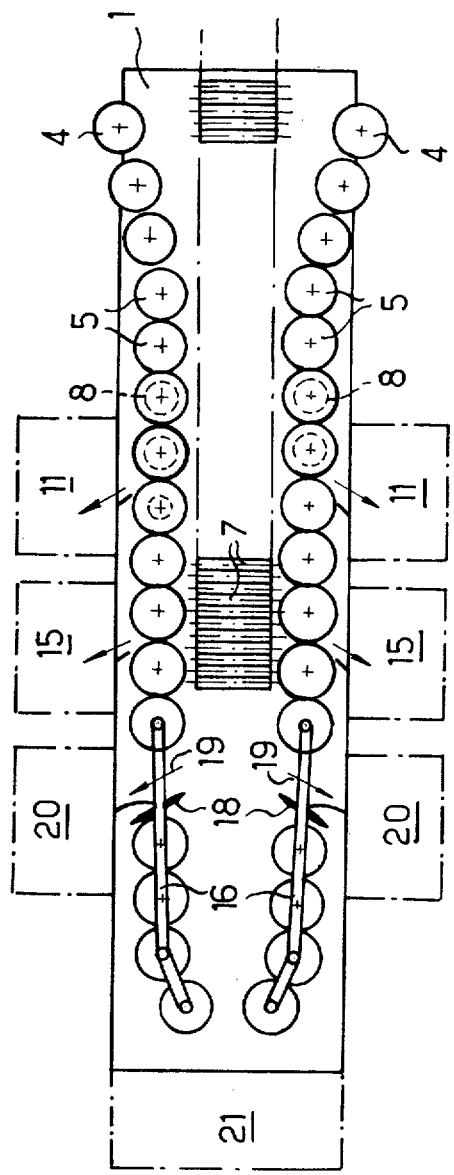
FIG. 3

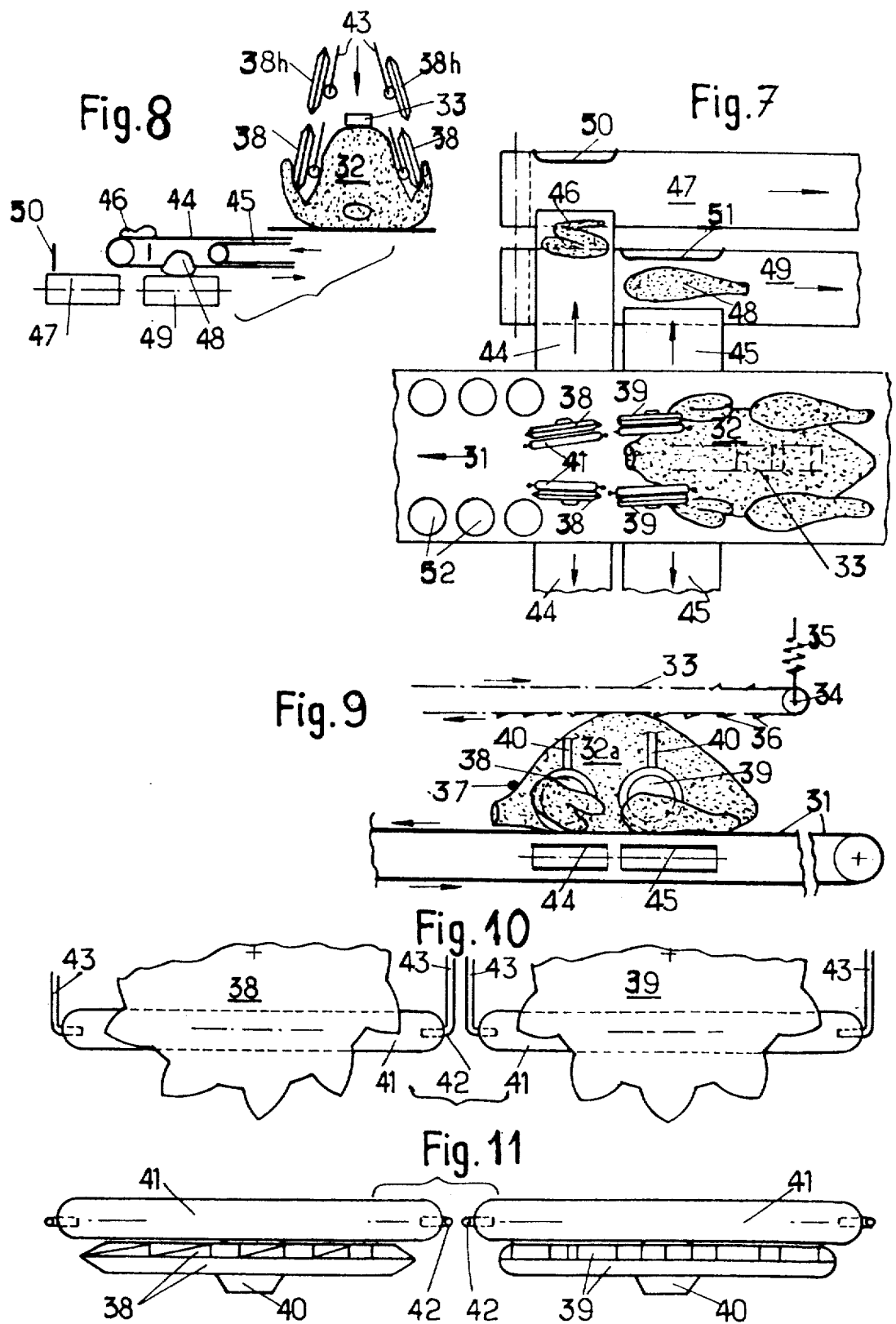

3,890,674

APPARATUS FOR REMOVING THE BONES FROM POULTRY

The present invention relates to the de-boning of poultry. Hitherto, this operation has been performed manually, and was therefore time-consuming and expensive.

It is an object of the invention to provide apparatus for automatically de-boning poultry. It is a further object to provide such apparatus in such form that it is suitable for poultry of different carcass size e.g., turkeys and chickens.

With this and other objects in view, the invention consists in apparatus for removing the bones from poultry, comprising a base conveyor to receive the poultry thereon and cause it to travel from an infeed end to an outfeed end, two rows of vertically mounted rollers, one at each side of said conveyor, a plurality of said rollers proceeding inwardly from said infeed end being peripherally grooved at two axially separated locations, a row of horizontally mounted rollers arranged above said conveyor to press down on the incoming poultry, cutter means on at least two laterally opposed ones of said vertically mounted rollers, wheels having curved cutting flutes arranged on at least two other laterally opposed ones of said vertical rollers, said wheels being rotatable in a direction opposite to that of the other vertically mounted rollers, deflecting means consisting of selected ones of said vertically mounted rollers, two hinged systems comprising selected groups of said vertically mounted rollers at said outfeed end with said rollers being mounted on support members, said hinged systems forming a pair of inwardly tapering walls to enclose the poultry carcass minus its legs and wings, said hinged systems also incorporating a plurality of cutters arranged obliquely to said vertical line, hoppers positioned to receive bones from the wings and legs and the flesh respectively, and a hopper at the outfeed end of the apparatus to receive the stripped carcass.

There may however be particular instances in which the legs and wings are required for separate use and only the remainder of the bird is to have the bones removed. In this case, the apparatus may be provided with a preliminary conveyor, means for moving said preliminary conveyor, chain means mounted above said preliminary conveyor, said chain having grip means, means for moving said chain means substantially at the same speed as said preliminary conveyor, two oblique deflectors being resiliently lowerable on either side of a bird on said preliminary conveyor, said deflectors incorporating revolving cutters to cut off the legs and wings respectively of said bird, transverse conveyors means and longitudinal conveyor means movable in the opposite direction to said preliminary conveyor to receive the severed legs and wings respectively. The carcass stripped of its legs and wings may then enter the main part of the apparatus described above where the means provided to remove the bones from the wings and legs run idle.

Figure 5:
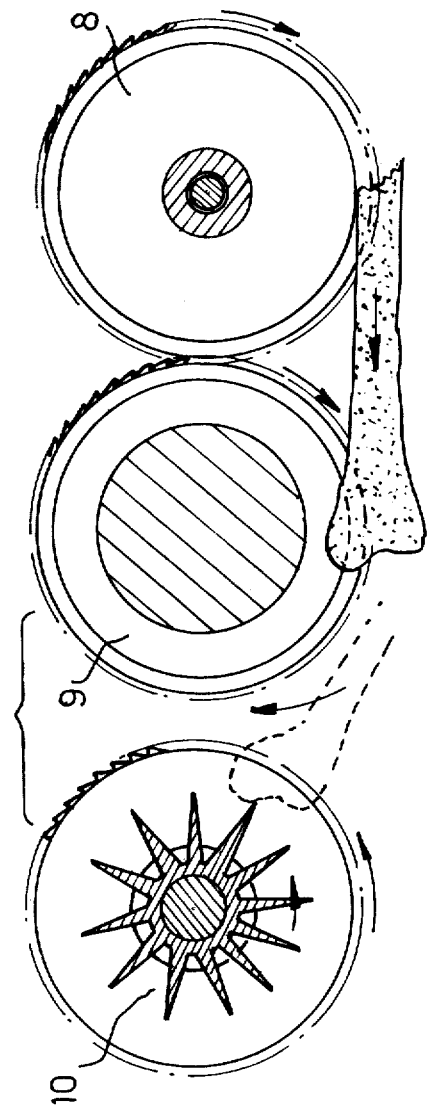
Figure 6:
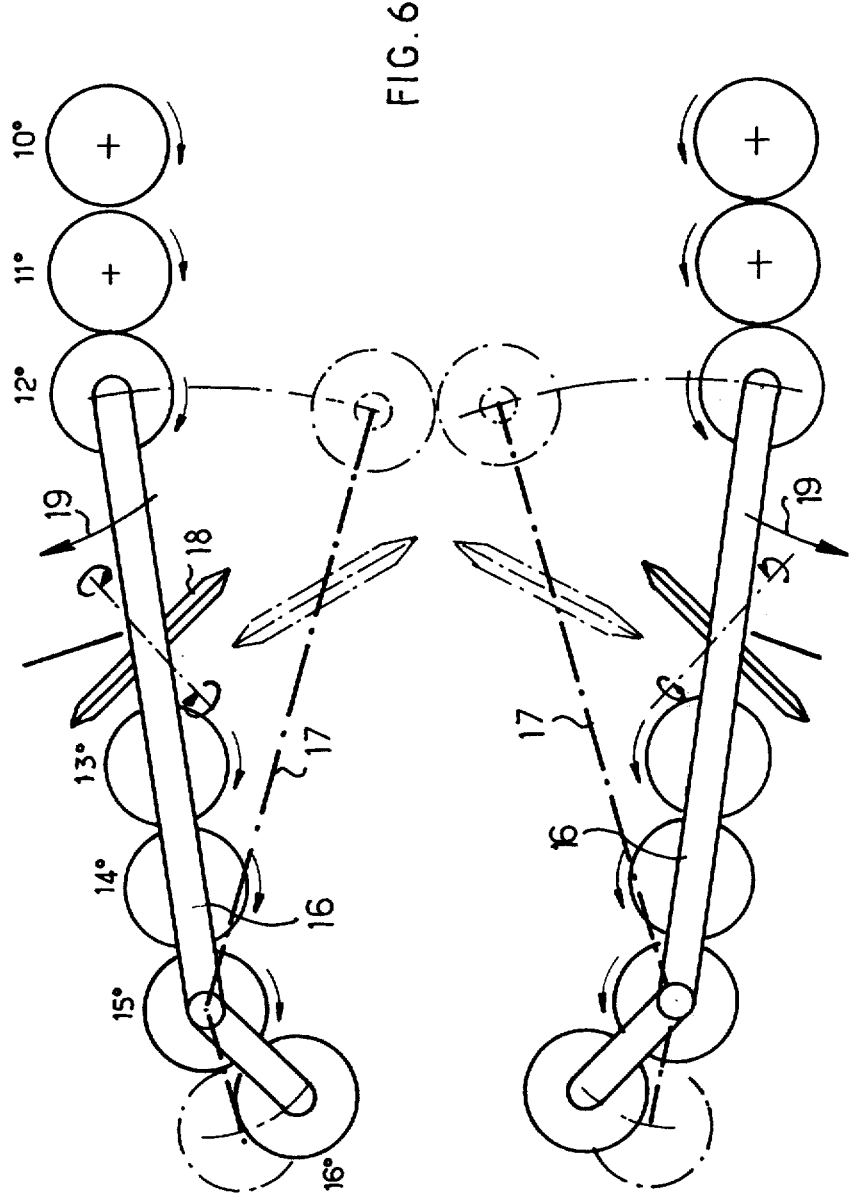

In order that the invention may be more clearly understood, reference will now be made to the accompanying drawings which show one embodiment thereof by way of example, and in which:

FIGS. 1, 2 and 3 are schematic views of the apparatus in end elevation, side-section and plan respectively, FIGS. 4 and 5 show enlarged details of FIGS. 2 and 3 respectively FIG. 6 shows the enlarged view of the system of FIG. 3, FIG. 7 shows a plan view of a detail of an optional preliminary apparatus for removing wings and legs e.g., from large birds, FIGS. 8 and 9 show two views to supplement FIG. 7 and FIGS. 10 and 11 show two views of the combined cutters of the apparatus of FIG. 7.

Referring now to the drawings, in FIGS. 1, 2 and 3 can be seen a moving conveyor 1 which is flexible and has a rough surface and which is driven by two rollers 2 and 3, powered by a suitable power source such as an electric motor or motors. The conveyor moves in the direction of the arrows shown in FIG. 2. Two rows or sets, each of three revolving rollers such as 4, located on the right and left of the apparatus viewed from the infeed end, rotate in the direction shown by the arrows. They are so located in plan as to form an inwardly tapering passageway, cooperating with the conveyor belt 1 so as to feed a freshly killed bird, lying on its back with its neck forward, i.e., in the direction of infeed and the direction of the upper pass of the conveyor belt into the apparatus and to force it inwards. The axes of the foremost rollers 4 thus lie in two converging vertical planes so as to exert pressure on the bird, while certain other rollers such as 5 have their axes in two parallel vertical planes, i.e., the rows of rollers 5 are parallel. The rollers 4 rotate more quickly than those following them.

Each of the foremost rollers 4 are divided into five sections, by the grooves 6, as will be seen in FIGS. 1 and 2; the diameter of three of these sections is the maximum diameter of the roller, while the diameter of the base of the two grooves is about half the maximum diameter of the roller. The upper and lower sections of the rollers are respectively all of the same axial length but the axial length of the central section of each roller increases progressively, from the infeed end and thus the axial length of the upper and lower groove 6 progressively reduce. This axial recess length remains the same on both the left and right hands in the case of the fourth and fifth position vertical rollers. Roughly at the height of the middle of the top sections of the rollers is mounted a row of horizontal rollers 7 which are free to turn on their axes and which press down on the incoming birds at the same time as the birds are constricted between the vertical rollers 4 and 5. The grooves 6 form two upper passages, one on the right and one on the left, and two lower passages (see FIG. 1). The legs of the birds (where present) engage in the upper passages and the wings thereof (where present) in the lower passages. See however the later description relative to FIGS. 7 to 11. The rows of vertical rollers will now be considered in serial order, from the infeed end of the apparatus which is situated at the right hand side of FIGS. 2 and 3. The vertical rollers in FIG. 2 are sequentially marked 10°....16° from the infeed end. The left hand and right hand vertical rollers 6° are each fitted into a cutter 8 and there the cutters remove the bones from the birds' legs. The disposition of the cutters 8 can be seen better in FIG. 4, which shows one of them in greater detail and this Figure also shows that the groove in which each cutter is disposed is semi-circular in shape. The cutters 8 are formed by two discs which revolve in opposite directions at a very much higher speed than that at which the rollers rotate. The peripheries of the discs 8 are provided with shallow teeth (see FIG. 5) to prevent them cutting into the bones along with the flesh. The cutters 8 are concentric with the vertical rollers and mounted on a driven concentric shaft 8a. FIG. 4 also shows that the rollers carrying the cutters 8 are divided into two separate parts thus enabling the cutters to be fitted thereto.

On the seventh-position rollers marked 7°, the upper groove is of a complex shape the cross-sectional outline of which is made up of two arcs and two straight sections separated by an arc which forms a throat (see FIG. 4). Together, these sections will perform the role of a deflector in cooperation with the eighth-position cylinders, marked 8° the groove in each of which contains a fluted wheel 10, with curved cutting edges to the flutes (FIGS. 2 and 4), which rotates in the opposite direction from the first rollers 4. The leg bones are caught between this fluted wheel and the deflector and are discharged to right and left into two hoppers 11 (FIG. 3).

The ninth-position rollers, marked 9°, contain cutters 12, similar to cutters 8, in their lower grooves. These cutters 12 separate the wings from the body and tenth-position rollers, marked 10°, having deflectors 13 similar to deflectors 9, cooperate with fluted wheels 14 mounted on the eleventh-position rollers marked 11°, to discharge the wing bones to right and left into hoppers 15 (FIG. 3). All the vertical rollers are mounted on shafts.

The twelfth, thirteenth, fourteenth, fifteenth and sixteenth-position vertical rollers on the left and right hand sides and marked 12° to 16°, are secured to movable cranked supports 16 which pivot on the shafts of the fifteenth-position rollers. Normally these supports are in the position shown in solid lines in FIGS. 3 and 6, but when the body of a bird enters the funnel formed by the two systems comprising supports 16 and associated rollers, the pressure exerted by the bird on the sixteenth-position rollers as it continues to move forward causes the supports 16 to pivot to position 17 shown dotted in FIG. 6 in which the twelfth-position rollers touch.

Between the twelfth and thirteenth-position rollers, the supports 16 have a set of three cutters 18 lying one above the other (FIGS. 2, 3 and 6). The two circular blades forming each of these cutters, which are similar to those forming cutters 8 and 12, turn in opposite directions although the means for imparting the rotary movement are not shown. These cutters strip the flesh from the carcass and the flesh is ejected as shown by arrows 19 into hoppers 20, with the carcasses falling into hopper 21.

The drive motor for the apparatus is schematically shown at 22 and the various mechanical transmissions at 23. These arrangements are situated above the apparatus proper to prevent liquid from the birds falling on them. The last rollers mounted on the movable support 16 are arranged to revolve more rapidly than those preceding them, their speed being the same as that of the first cylinders 4 at the infeed end.

In certain cases it may be desired to use the apparatus of FIGS. 1 to 6 only for de-boning the carcass of a bird stripped of its wings and legs. This may be so where large birds such as turkeys are being processed.

The apparatus of FIGS. 7 to 11 may be used as a preliminary apparatus for stripping the wings and legs of birds which are then fed into the apparatus of FIGS. 1 to 6 in which the means for removing the bones from wings and legs run idle.

Thus in FIGS. 7, 8 and 9 a conveyor belt 31 can be seen transporting a bird shown at 32 in FIGS. 7 and 8, which is lying on its back with its neck forward, in the direction of the arrows. Above, a chain 33, which is suspended by elastic means 35 and runs on drive rollers 34, presses on the bird while moving forward at the same speed as the conveyor. The chain 33 has projections 36 giving a better grip to transmit thrust. In FIG. 9, the bird is shown in a more advanced position 32a in which adjustable detection means, which may operate mechanically or as a result of a light beam shown schematically at 37 being interrupted, cause a group of four cutters 38 and 39, which are resiliently supported above the bird on the right and left hand sides (see FIGS. 7 and 8), to be lowered. In FIG. 8 the cutters 38 are shown in the lowered position and in the raised position (38h).

In FIG. 9 the cutters are lowered and at 40 there are shown schematically the hollow supports for them which enclose the transmissions which turn them in opposite directions, the rotary movement being produced by, for example, flexible cables or by means of compressed air and miniature turbines, using known means. In FIGS. 7 and 8 the supports are not shown so as to simplify the drawing. They are also omitted from FIGS. 10 and 11 which show the preferred shapes for the teeth on the cutters' peripheries, which are pointed and tilted in the case of cutter disc 38 and rounded in the case of cutter 39. The two cutters 38 and the two cutters 39 are symmetrically positioned with respect to the plane of symmetry of the conveyor 31. In FIGS. 8, 10 and 11 it can be seen that the cutters have associated with them rollers 41 which are free to turn on shafts 42, the shafts being, for example, flexible metal rods 43 which are bent at the ends so as to fit into openings made in the end of the rollers 41. By spreading the suspension rods 43 apart elastically, the rollers may easily be fitted or removed for cleaning. The axes of the rollers are situated at a lower level than the axes of the cutters, this being substantially at one third to one quarter of the diameter of the disc. The rods 43 are secured to the flexible suspension 40 for the cutters. When the suspension is lowered the rollers slide along the outside of the bird and move apart to suit the size of the bird. The cutters 38 fit between the body and the wings and the cutters 39 between the body and the legs (FIGS. 8 and 9). The wings fall away to right and left onto a transverse conveyor 44 and the legs onto a transverse conveyor 45. These conveyors transport the wings 46 onto a transverse conveyor 47 and the legs 48 onto a transverse conveyor 49. The two conveyors 47 and 49 move in the opposite direction from conveyor 31 so as to transport the wings and legs respectively to the point at which they will be used. The legs, for example, are fed directly, while so orientated, into a machine for removing leg bones which forms the subject of a French Patent Application filed by the present Applicant on the Sept. 20, 1973 with the number 73.33699 for a "Machine for removing the bones from the legs of poultry." At 50 and 51, are shown schematically buffers which prevent the wings and legs falling from conveyors 44 and 45 from dropping off.

The bird, after the wings and legs have been removed, continues its progress along conveyor 31 and enters the main apparatus shown in FIGS. 1 to 6, the rollers 52 of FIG. 7 corresponding to the rollers 4 of FIGS. 1 to 6. The preliminary apparatus of FIGS. 7 to 11, instead of being made separately from the main apparatus of FIGS. 1 to 6, may be made unitarily therewith. The conveyors 1 and 31 may then form a single continuous conveyor in the two successive portions of the combined apparatus instead of being separate.

Thus, it will be clear that the apparatus referred to above has been described purely by way of example and that various modifications may be made to the specific details set forth, without in any way departing from its scope as defined by the appended claims.

I claim:

1. Apparatus for removing the bones from poultry, comprising a base conveyor to receive the poultry thereon and cause it to travel from an infeed end to an outfeed end, two rows of vertically mounted rollers, one at each side of said conveyor, a plurality of said rollers proceeding inwardly from said infeed end being peripherally grooved at two axially separated locations, a row of horizontally mounted rollers arranged above said conveyor to press down on the incoming poultry, cutter means on at least two laterally opposed ones of said vertically mounted rollers, wheels having curved cutting flutes arranged on at least two other laterally opposed ones of said vertical rollers, said wheels being rotatable in a direction opposite to that of the other vertically mounted rollers, deflecting means consisting of selected ones of said vertically mounted rollers, two hinged systems comprising selected groups of said vertically mounted rollers at said outfeed end with said rollers being mounted on support members, said hinged systems forming a pair of inwardly tapering walls to enclose the poultry carcass minus its legs and wings, said hinged systems also incorporating a plurality of cutters arranged in vertical lines with each of said cutters arranged obliquely to said vertical line, hoppers positioned to receive bones from the wings and legs and the flesh respectively, and a hopper at the outfeed end of the apparatus to receive the stripped carcass.

2. Apparatus according to claim 1, wherein some of said vertically mounted rollers at said infeed end are mounted to define an inwardly tapering path, said rollers defining said tapering path, and said rollers forming part of said hinged systems being rotatable faster than the remainder of said vertically mounted rollers.

3. Apparatus according to claim 2, comprising further, motor means and means for transmitting rotary movements to said vertically mounted rollers, said two means being mounted adjacent the upper parts of said rollers.

4. Apparatus according to claim 1, comprising also a preliminary conveyor, means for moving said preliminary conveyor, chain means mounted above said preliminary conveyor, said chain having grip means, means for moving said chain means substantially at the same speed as said preliminary conveyor, two oblique deflectors being resiliently lowerable on either side of a bird on said preliminary conveyor, said deflectors incorporating revolving cutters to cut off the legs and wings respectively of said bird, transverse conveyor means and longitudinal conveyor means movable in the opposite direction to said preliminary conveyor to receive the severed legs and wings respectively.

5. Apparatus according to claim 4, wherein said revolving cutters have teeth provided with cutting edges, the said cutting edges for severing the poultry legs being of a rounded shape, and said cutting edges for severing the poultry wings forming an acute angle to their cutting wheel, and said teeth being tilted in the direction in which their cutters are rotatable.

6. Apparatus according to claim 4, wherein said oblique deflectors incorporate rounded portions to touch the poultry and prevent the cutters penetrating into the flesh on the carcass thereof.

7. Apparatus according to claim 6, wherein said rounded portions are formed by horizontal rollers situated substantially higher than the level of the cutting edges of the cutters at a distance of about one quarter to one third of the diameter of said cutters.

* * * * *